UNITED STATES PATENT OFFICE.

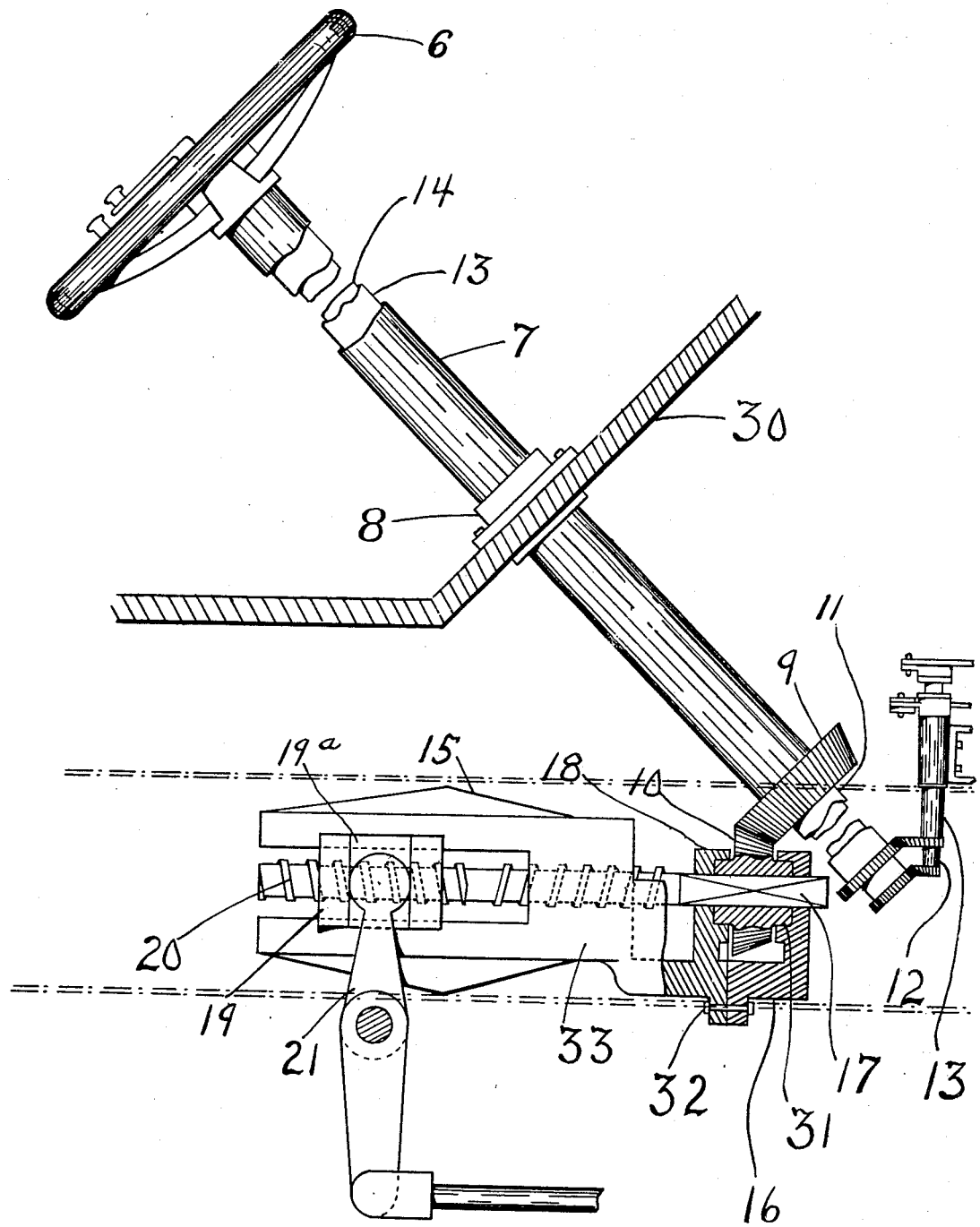

ARNOLD M. SQUIRE, OF CLEVELAND, OHIO.

STEERING DEVICE.

1,069,199. Specification of Letters Patent. Patented Aug. 5, 1913.

Application filed March 29, 1912. Serial No. 687,151.

*To all whom it may concern:*

Be it known that I, ARNOLD M. SQUIRE, a subject of King George V of England, residing at Cleveland, in the county of Cuyahoga and State of Ohio, have invented certain new and useful Improvements in Steering Devices, of which the following is a specification.

This invention relates to steering devices, particularly adapted for use on automobiles, and has for its object to provide an improved screw motion steering gear which will prevent back kick or shock such as would otherwise be transmitted to the steering wheel from the road wheels.

The invention has a further advantage that, by means of a double screw, the steering devices will act quickly, and give a large motion to the road wheels from small turn of the steering post.

Other advantages will appear from the following specification.

The accompanying drawing is a side elevation, partly in section, of a steering gear constructed according to the invention.

Referring specifically to the drawings, 6 indicates the hand wheel mounted on the end of the tubular post 7 which is supported on the foot board 30 by means of the collar 8. At its lower end the steering post has a beveled pinion 9 which meshes with a pinion 10 which has an extended hub 31 resting at its opposite ends in bearings in a casing 18 which is conveniently split and joined by bolts 32. The pinion 10 is slidable on the squared end 17 of the screw 20, and when the pinion is turned the screw will rotate and also travel lengthwise accordingly. The screw has right and left threads one of which works through a threaded block 33 and the other of which works through a threaded nut or head 19 which slides in guides 15 integral with the block 33, which block will be fixed to some stationary part of the vehicle frame. The nut 19 has a groove 19ª which receives the head of a lever 21 which is connected in a known manner to the steering knuckles. The right and left threads double the motion imparted by the screw to the block 19, as compared to a single screw, and the gears 9 and 10 may be so proportioned that a large movement will be effected by relatively small turn of the steering post. Furthermore, shocks transmitted from the ground wheels by the lever 21 will be received and sustained by the block 33 and the frame part to which it is attached, any vibration of the screw being without effect on the gears and the steering post, since, as stated the screw is slidable in the gear 10. There is also no longitudinal movement of the steering post.

The spark control device 11 is geared to the sleeve 13 which extends through the steering post, and the throttle control device 12 is geared to the rod or tube 14 which also extends through the steering post, so that the control of these devices is effected in a known manner through the axis of the steering post without interfering in any way with the operation thereof.

The right and left threads are better than a single thread of high pitch, because the latter has a tendency to overdraw or feed back, in which event a shock on the front wheels would be transmitted back through the lever to the block, and the pressure on the block might cause the screw to turn, and this in turn would tend to turn the wheel 6. With right and left threads of small pitch there is no overdraw or back lash, and therefore no shock to the wheel 6.

What I claim as new is:

In a steering device, the combination of a rotary steering post, a relatively fixed threaded block having opposite bearings, a gear wheel mounted to turn in said bearings, a nut slidable on the block, a screw having right and left threads engaging respectively the threads of the block and the nut, and also having a non-circular portion slidable in the gear wheel, and a gear wheel on the post, meshing with the first named gear wheel.

In testimony whereof, I do affix my signature in presence of two witnesses.

ARNOLD M. SQUIRE.

Witnesses:
JOHN A. BOMMHARDT,
STEDMAN J. ROCKWELL.